US 8,207,978 B2

(12) United States Patent
Spangler et al.

(10) Patent No.: US 8,207,978 B2
(45) Date of Patent: Jun. 26, 2012

(54) SIMPLIFICATION OF 3D TEXTURE ADDRESS COMPUTATION BASED ON ALIGNED, NON-PERSPECTIVE OBJECTS

(75) Inventors: Steven J. Spangler, El Dorado Hills, CA (US); Benjamin R. Fletcher, Mather, CA (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 11/478,796

(22) Filed: Jun. 29, 2006

(65) Prior Publication Data

US 2008/0001964 A1   Jan. 3, 2008

(51) Int. Cl.
*G06T 11/40* (2006.01)

(52) U.S. Cl. ......... 345/552; 345/581; 345/582; 345/564

(58) Field of Classification Search ........... 345/581–585
See application file for complete search history.

(56) References Cited

U.S. PATENT DOCUMENTS

| | | | | |
|---|---|---|---|---|
| 4,718,024 A * | 1/1988 | Guttag et al. | | 345/561 |
| 5,751,290 A * | 5/1998 | Lee et al. | | 345/421 |
| 5,764,237 A * | 6/1998 | Kaneko | | 345/552 |
| 6,133,923 A * | 10/2000 | Ozawa | | 345/582 |
| 6,208,350 B1 * | 3/2001 | Herrera | | 345/582 |
| 6,252,564 B1 * | 6/2001 | Albert et al. | | 345/1.3 |
| 6,340,974 B1 * | 1/2002 | Nagashima | | 345/584 |
| 6,456,287 B1 * | 9/2002 | Kamen et al. | | 345/427 |
| 6,501,481 B1 * | 12/2002 | Wood et al. | | 345/582 |
| 6,538,658 B1 * | 3/2003 | Herrera | | 345/582 |
| 6,567,095 B2 * | 5/2003 | Wood | | 345/587 |
| 6,614,446 B1 * | 9/2003 | Van Overveld | | 345/582 |
| 6,778,181 B1 * | 8/2004 | Kilgariff et al. | | 345/582 |
| 6,864,900 B2 * | 3/2005 | Wasserman et al. | | 345/672 |
| 7,106,323 B2 * | 9/2006 | Laws et al. | | 345/420 |
| 7,145,570 B2 * | 12/2006 | Emberling et al. | | 345/582 |
| 7,158,141 B2 * | 1/2007 | Chung et al. | | 345/506 |
| 7,307,638 B2 * | 12/2007 | Leather et al. | | 345/582 |
| 7,405,735 B2 * | 7/2008 | Koguchi | | 345/587 |
| 7,411,592 B1 * | 8/2008 | Dunn | | 345/581 |
| 2002/0050988 A1 * | 5/2002 | Petrov et al. | | 345/418 |
| 2002/0171672 A1 * | 11/2002 | Lavelle et al. | | 345/630 |
| 2003/0142104 A1 * | 7/2003 | Lavelle et al. | | 345/552 |
| 2003/0169271 A1 * | 9/2003 | Emberling et al. | | 345/582 |
| 2004/0254972 A1 * | 12/2004 | Woo et al. | | 708/650 |
| 2005/0259104 A1 * | 11/2005 | Koguchi | | 345/552 |
| 2006/0164429 A1 * | 7/2006 | Mantor et al. | | 345/582 |
| 2007/0002047 A1 * | 1/2007 | Desgranges et al. | | 345/426 |
| 2007/0091088 A1 * | 4/2007 | Jiao et al. | | 345/426 |

OTHER PUBLICATIONS

Pending U.S. Appl. No. 11/486,686, filed Jul. 14, 2006. Inventor: Spangler, et al.

\* cited by examiner

*Primary Examiner* — Antonio A Caschera
(74) *Attorney, Agent, or Firm* — Trop, Pruner & Hu, P.C.

(57) ABSTRACT

Apparatus, systems and methods for the simplification of 3D texture address computations based on aligned, non-perspective objects are disclosed. For example, a method is disclosed including receiving a texture address of a first pixel and determining a texture address of a second pixel by applying at least one offset to the texture address of the first pixel. Other implementations are also disclosed.

8 Claims, 4 Drawing Sheets

SIMPLIFICATION OF 3D TEXTURE ADDRESS COMPUTATION BASED ON ALIGNED, NON-PERSPECTIVE OBJECTS

BACKGROUND 3D rendering engines often improve rendering performance by using texture samplers that can concurrently process more than one pixel. For example, some texture samplers can sample textures concurrently for blocks of two or more adjacent pixels. When processing adjacent pixels a typical texture sampler will undertake a separate texture address calculation for each pixel, fetch from memory the texture data (i.e., texels) for vertices bounding each texture address and then filter or blend the fetched texture data to obtain blended pixel values. However, using software to calculate separate texture addresses for adjacent pixels increases computation times while implementing the texture address calculations in hardware consumes more die space.

In some circumstances, 3D rendering engines may be used to rasterize primitives where the texture is aligned to the pixels being rendered. Aligned textures may arise where there is no rotation or perspective operations being applied to the textured primitive and hence the texture coordinates (e.g., u, v) are aligned to the pixel coordinates (e.g., x, y). The standard approach of undertaking separate texture address calculations for adjacent pixels fails to take advantage of the rectilinear relationship between texture coordinates and pixel coordinates for aligned textures.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
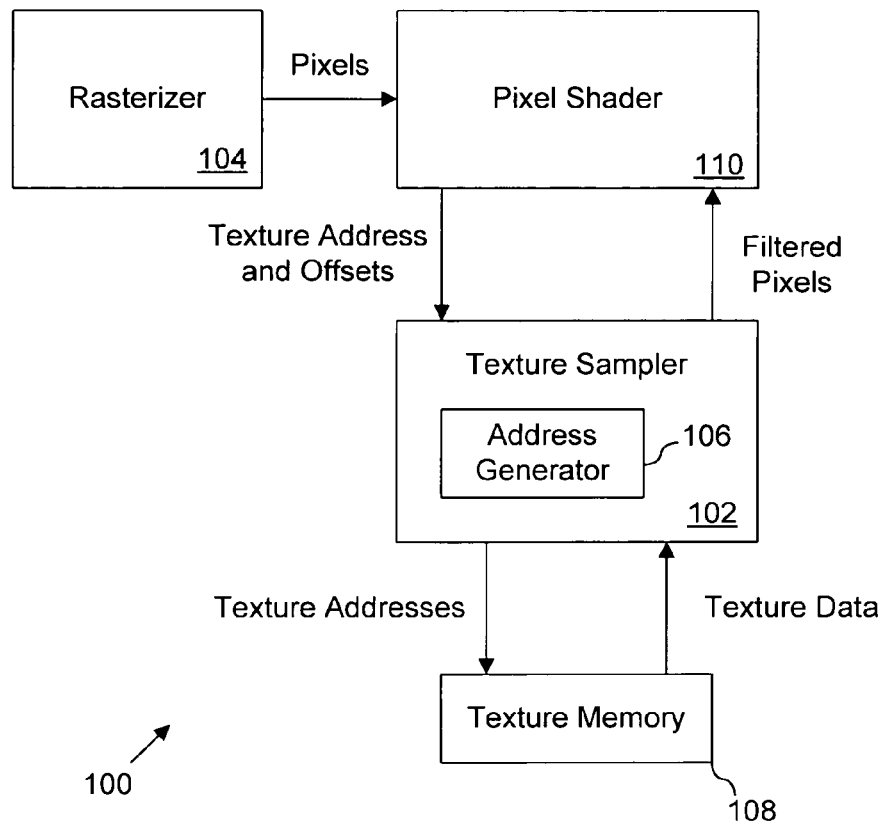
FIG. 1 illustrates portions of a 3D rendering engine in accordance with some implementations of the invention.

FIG. 1 is a simplified block diagram of portions of a 3D rendering engine 100 in accordance with some implementations of the claimed invention. Engine 100 may include a texture sampler 102, a rasterizer 104, texture memory 108, and a pixel shader 110. Those skilled in the art will recognize that some components typically found in a 3D rendering engine (e.g., tessellation unit, vertex shader, etc.) and not particularly germane to the claimed invention have been excluded from FIG. 1 so as not to obscure implementations of the invention. Moreover, while FIG. 1 illustrates one texture sampler 102 and one pixel shader 110, those skilled in the art will recognize that more than one texture sampler may be implemented or coupled to a pixel shader and/or more than one pixel shader may be implemented without departing from the scope and spirit of the claimed invention.

In addition, those skilled in the art may recognize that a 3D rendering engine, such as engine 100, may be tasked with rendering pixels in a compositing context in which the engine may undertake 3D operations that may include rendering objects having textures that exhibit rotation or perspective relative to pixel coordinate space and other rendering operations, such as "blit"-type operations, in which textures may be aligned to pixel coordinate space. For example, those skilled in the art will recognize that such a compositing context may be encountered when using a 3D rendering engine to render High Definition Digital Video Disc (HD-DVD) data that includes both 3D data streams and 2D data streams where the 2D data streams may include primitives exhibiting aligned textures. However, the invention is not limited to compositing contexts, HD-DVD or otherwise.

Texture sampler 102 may, in accordance with some implementations of the invention, comprise any graphics processing logic and/or hardware, software, and/or firmware, capable of using address generator logic 106 in conjunction with a texture address for one pixel and associated texture offsets provided by shader 110 to determine texture addresses for one or more pixels adjacent to that pixel. Thus, address generator logic 106 may receive texture coordinates and associated texture offsets and in response may generate corresponding texture map addresses. Sampler 102 may then use those addresses to access the corresponding raw textures stored and/or held in memory 108, may use that texture data to generate filtered pixel values and may provide those filtered pixels to shader 110. This capability of texture sampler 102 and associated address generator logic 106 will be described in greater detail below.

Rasterizer 104 may be capable of processing graphics primitives, such as triangle primitives, provided by a setup module (not shown) to generate pixels associated with a pixel or "screen" coordinate system. In doing so, rasterizer 104 may generate attributes for each pixel encountered in traversing, for example, a given triangle by interpolating triangle vertex coordinates (e.g., (u, v) vertex texture coordinates). Rasterizer 104 may provide pixels and associated attributes to shader 110.

Those skilled in the art may recognize that elements of engine 100, such as rasterizer 104 may generate pixel fragments where such pixel fragments may comprise integer x and y grid coordinates, a color value, depth values, etc. in addition to texture coordinates for a given pixel. However, for the most part, such details are beyond the scope of the invention and, in order to not obscure description of implementations of the invention, the term "pixel" or "pixel data" will be used throughout this disclosure even though those skilled in the art may recognize that rasterizer 104 may provide shader 110 with pixel fragments (e.g., including pixel texture addresses). Hence, while sampler 102 may be described as providing filtered pixel fragments (i.e., filtered pixel color values) to shader 110, in the interests of clarity this disclosure will describe sampler 102 as providing filtered pixels to shader 110.

Texture memory 108 may comprise any memory device or mechanism suitable for storing and/or holding one or more texture maps specifying texel data (e.g., in the form of a texture map associated with a texture coordinate system). While memory 108 may comprise any volatile or non-volatile memory technology such as Random Access Memory (RAM) memory or Flash memory, the invention is in no way limited by the type of memory employed for use as memory 108.

Pixel shader 110 may comprise any graphics processing logic and/or hardware, software, and/or firmware, capable of receiving filtered pixel data from texture sampler 102. For example, shader 110 may comprise a programmable execution unit. While those skilled in the art will recognize that pixel shaders such as shader 110 often undertake processes such as implementing various per pixel shading routines, such functionality is outside the scope of the invention and will not be discussed further. While FIG. 1 shows sampler 102 as providing filtered pixel data to shader 110, the invention is not limited in this regard and those skilled in the art will recognize that sampler 102 may provide fetched texture (e.g., texels) to shader 110 and that shader 110 may undertake filtering of the texture data to generate filtered pixels.

In accordance with some implementations of the invention, shader 110 may further be capable of providing pixel texture coordinate values for use by texture sampler 102 to access or fetch texture data (e.g., texel values) from texture memory 108. Further, in accordance with some implementations of the invention, shader 110 may provide sampler 102 with a texture address for a first or initial pixel of a pixel block including two or more contiguous pixels along with associated texture offsets as will be explained in greater detail below.

Figure 2:
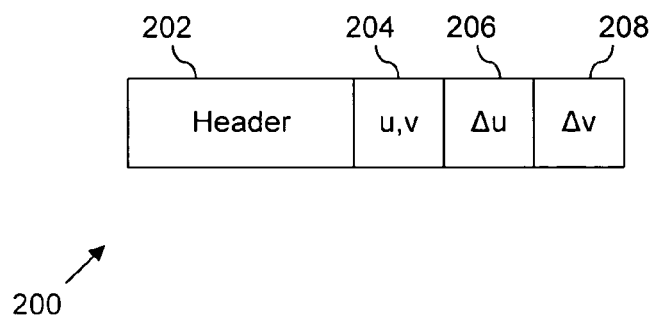
FIG. 2 illustrates an example texture sample message in accordance with some implementations of the invention.

FIG. 2 illustrates an example texture sample request or message 200 in accordance with some implementations of the invention. Message 200 may be generated by shader 110 and provided to sampler 102 to instruct sampler 102 to fetch or sample texture data from memory 108. Message 200 may include a header 202, a pixel texture address or texture coordinate pair 204 and associated texture address offsets 206 and 208. Some implementations of the manner in which sampler 102 may utilize message 200 to fetch texture data will be described in further detail below.

Figure 3:
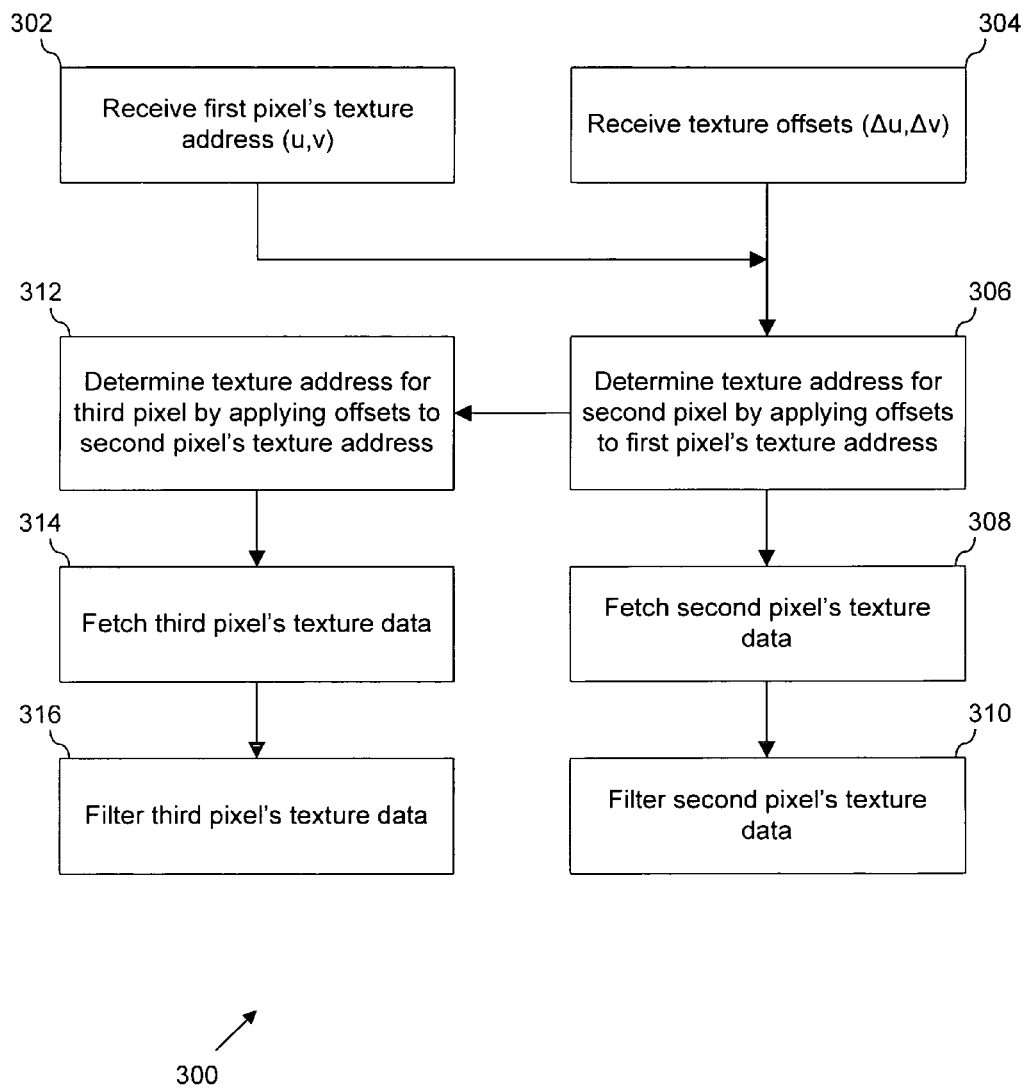
FIG. 3 is a flow chart illustrating a process in accordance with some implementations of the invention.

FIG. 3 is a flow chart illustrating a process 300 in accordance with some implementations of the invention. While, for ease of explanation, process 300 may be described with regard to engine 100 of FIG. 1 and example message 200 of FIG. 2, the claimed invention is not limited in this regard and other processes or schemes supported by appropriate devices in accordance with the claimed invention are possible.

Figure 4:
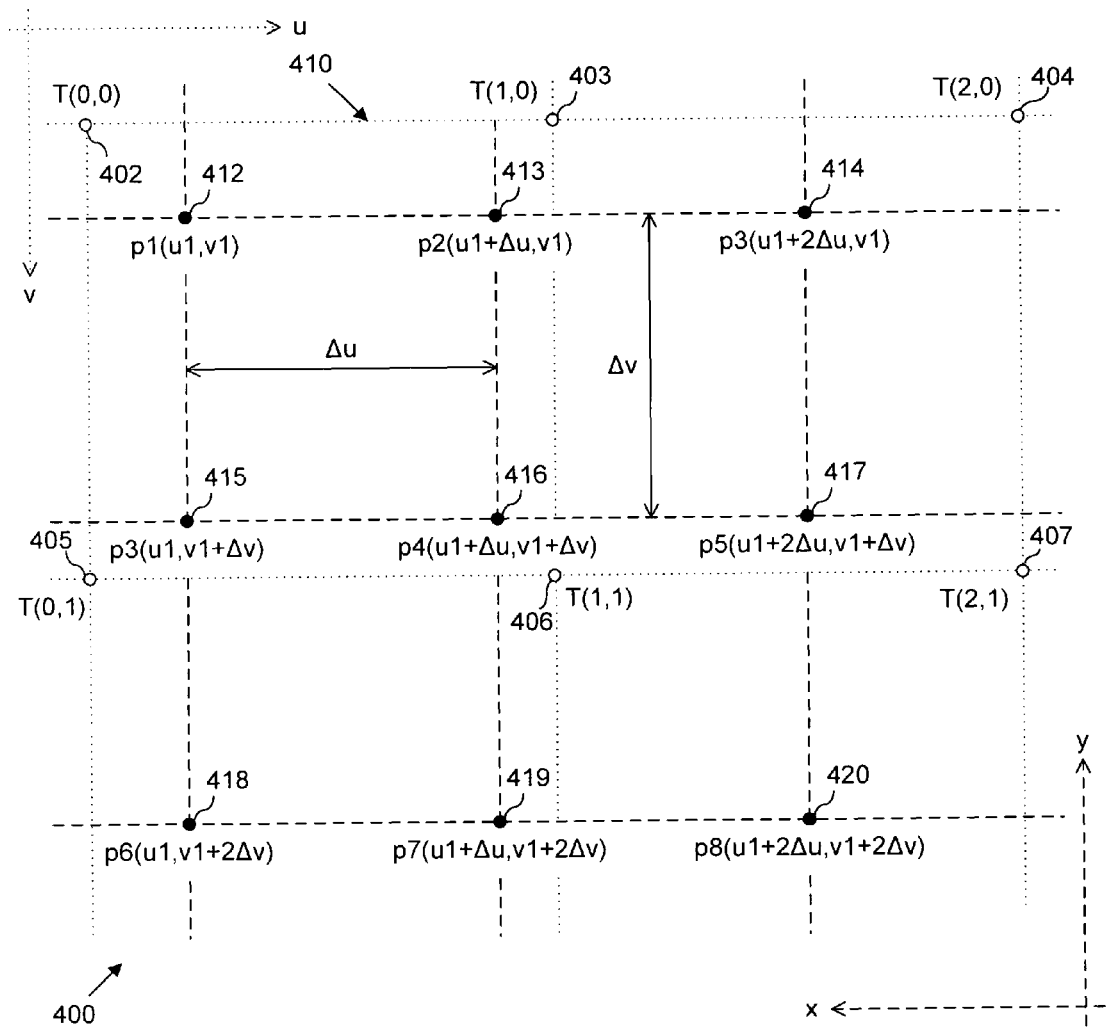
FIG. 4 illustrates a representative coordinate labeling scheme in accordance with some implementations of the invention.

FIG. 4 illustrates a representative coordinate labeling scheme 400 that, while aiding discussion of process 300, should not be construed to limit the claimed invention in anyway. Scheme 400 shows six contiguous texels 402-407 of a portion of a texture map 410 organized in a typical (u, v) texture address or coordinate space along with nine contiguous pixels 412-420 arranged in a typical (x, y) pixel or screen address or coordinate space. While those skilled in the art may recognize that labeling respective texture coordinate dimensions as u and v is typical, the invention is not limited to a particular texture coordinate labeling scheme or, for that matter, to a particular pixel coordinate labeling scheme. In addition, while texel 402 is shown at the origin (0, 0) of map 410 this designation was chosen to simplify the description of FIG. 4 and is otherwise not meant to limit the invention in any way. Those skilled in the art will further recognize that texture maps such as texture map 410 may be stored or held in memory, such as texture memory 108, coupled to a texture sampler, such as sampler 102.

As FIG. 4 shows, the u, v coordinate system or space associated with texture map 410 is aligned to the x, y coordinate system or space of pixels 412-420. In other words, the u axis of the texture address space is aligned to or shares the same orientation as the x axis of the screen space while the v axis of the texture address space is aligned to or shares the same orientation as the y axis of the screen space. As FIG. 4 also shows, each pixel 412-420 is offset from the adjacent pixels in the x dimension by a constant value or offset $\Delta u$ corresponding to a fixed number of units in the u dimension of the texture coordinate space. Similarly, each pixel 412-420 is offset from the adjacent pixels in the y dimension by another constant value or offset $\Delta v$ corresponding to a fixed number of units in the v dimension of the texture coordinate space. While FIG. 4, as illustrated, shows offsets $\Delta u$ and $\Delta v$ as having similar magnitudes, the invention is not limited in this regard. Those skilled in the art will recognize that the texture maps may exhibit different magnitudes for offsets $\Delta u$ and $\Delta v$.

Process 300 may begin with receiving a first pixel's texture address [act 302] and receiving associated texture offsets [act 304]. In some implementations of the invention, acts 302 and 304 may involve sampler 102 receiving message 200 from shader 110 where message 200 includes a first pixel's address in the form of (u, v) texture coordinates 204 and associated texture coordinate offsets 206 ($\Delta u$) and 208 ($\Delta v$). Thus, referring also to FIGS. 1 and 4, acts 302 and 304 may, for example, comprise sampler 102 receiving texture coordinates (u1, v1) for pixel 412 (p1) along with texture coordinate offsets ($\Delta u$, $\Delta v$) that correspond to offsets in respective texture coordinate units of dimensions u and v between adjacent pixels.

Process 300 may continue with the determination of the texture address of a second pixel by applying the offsets to the first pixel's address [act 306]. In some implementations of the invention, address generator logic 106 may use the texture address of the first pixel and the associated texture offsets supplied in respective acts 302 and 304 to determine or generate the second pixel's texture address. For example, logic 106 may add the offset value $\Delta u$ to the texture coordinates (u1, v1) of pixel 412 to generate the texture address or coordinates (u1+$\Delta u$, v1) of pixel 413 (p2) that is adjacent to pixel 412 in the x dimension. Similarly, logic 106 may, for example, implement act 306 by adding the offset value $\Delta v$ to the texture coordinates (u1, v1) of pixel 412 to generate the texture address or coordinates (u1, v1+$\Delta v$) of pixel 415 (p3) that is adjacent to pixel 412 in the y dimension.

Process 300 may then continue with the fetching of the second pixel's texture data [act 308]. One way to implement act 308 is to have sampler 102 use the second pixel's texture address determined in act 306 to access or fetch associated texture data from texture memory 108. Thus, continuing one example from above, if address generator logic 106 determines the texture address (u1+$\Delta u$, v1) for pixel 413 (p2) in act 306 then sampler 102 may use that address to fetch, from memory 108, texture data associated with those texels 402, 403, 405 and 406 of map 410 that bound the texture address of pixel 413.

Process 300 may then continue with the filtering of the second pixel's texture data [act 310]. In some implementations of the invention, act 310 may be undertaken by sampler

102. For example, sampler 102 may use the texture coordinate (u1+Δu, v1) determined for pixel 413 in act 306 to undertake an appropriate weighting of the texture data for texels 402, 403, 405 and 406 fetched in act 306 to filter that texture data in act 310 using, for example, well known bilinear filtering methods. The invention is not, however, limited to any particular filtering method in act 310 nor is the invention limited to having sampler 102 perform act 310.

Process 300 may continue with the determination of the texture address of a third pixel by applying the offsets to the second pixel's address [act 312]. In some implementations of the invention, address generator logic 106 may use the texture coordinates of the second pixel determined in act 306 and the texture offsets supplied in act 304 to determine or generate the third pixel's texture address. For example, logic 106 may add the offset value Δu to the texture address (u1+Δu, v1) of pixel 413 to generate the texture address or coordinates (u1+2Δu, v1) of pixel 414 (p3) that is adjacent to pixel 413 in the x dimension.

Process 300 may then continue with the fetching of the third pixel's texture data [act 314]. One way to implement act 314 is to have sampler 102 use the third pixel's texture address determined in act 312 to access or fetch texture data from texture memory 108. Thus, continuing an example from above, if address generator logic 106 determines the texture address (u1+2Δu, v1) for pixel 414 in act 312 then sampler 102 may use that address to fetch, from memory 108, texture data associated with those texels 403, 404, 406 and 407 of map 410 that bound the texture address of pixel 414.

Process 300 may then continue with the filtering of the third pixel's texture data [act 316]. In some implementations of the invention, act 316 may be undertaken by sampler 102. For example, sampler 102 may use the texture coordinate (u1+2Δu, v1) determined for pixel 414 in act 312 to undertake an appropriate weighting of the texture data for texels 403, 404, 406 and 407 fetched in act 314 to filter that texture data in act 316 using, for example, well known bilinear filtering methods. The invention is not, however, limited to any particular filtering method in act 316 nor is the invention limited to having sampler 102 perform act 316.

The acts shown in FIG. 3 need not be implemented in the order shown; nor do all of the acts necessarily need to be performed. Also, those acts that are not dependent on other acts may be performed in parallel with the other acts. For example, acts 302 and 304 may be undertaken in parallel. Alternatively, act 304 may be undertaken before act 302 or acts 302 and 304 may be combined into a single action. In other words, the receipt of an initial texture address and associated texture offsets may take place in a single action through, for example, the receipt of message 200 by sampler 102 where message 200 includes both the initial texture address and the texture offsets. Further, at least some of the acts in this figure may be implemented as instructions, or groups of instructions, implemented in a machine-readable medium. Moreover, the labels "first pixel" and "second pixel" etc. are used simply to distinguish between separate, adjacent pixels and do not limit the invention to a particular pixel numbering or labeling scheme or a particular pixel processing order.

In other implementations in accordance with the invention, a texture sampler may, for example, undertake multiple concurrent sequences of acts 302-310. In other words a sampler may, concurrently, apply texture offsets to the addresses of two separate "first" pixels (e.g., pixels 412 and 413) to determine the texture addresses for two separate "second" pixels (e.g., pixels 416 and 417). Moreover, process 300 may be extended beyond a three pixel scheme. For example, a first or initial pixel of act 302 may comprise a first pixel (e.g., upper, left-hand pixel) of a 32-pixel block of pixels (e.g., four rows pixels having eight pixels each) and process 300 may be extended to use that first pixel's texture address to determine all texture addresses of pixels in the block by applying appropriate combinations of texture offsets.

In addition, the invention is not limited to any particular pixels processing scheme. In other words, for example, the invention contemplates addition or subtraction of texture offsets and applies equally well to processing pixels along or across pixel row or pixel column positions. For example, referring to FIGS. 3-4, acts 306-310 may comprise a texture sampler adding offset Δu to the texture coordinates (u1+Δu, v1+Δv) of pixel 416 to determine the texture address (u1+2Δu, v1+Δv) of adjacent pixel 417, obtaining or fetching the texture data for texels bounding pixel 417's address, and then filtering that texture data. Then acts 312-316 might comprise that sampler adding offset Δv to the texture address of pixel 417 to determine the texture address (u1+2Δu, v1+2Δv) of adjacent pixel 420, obtaining or fetching the texture data for texels bounding pixel 420's address, and then filtering that texture data.

Alternatively, for example, acts 306-310 may comprise a texture sampler subtracting offset Δu from the texture coordinates (u1+2Δu, v1+Δv) of pixel 417 to determine the texture address (u1+Δu, v1+Δv) of adjacent pixel 416, obtaining or fetching the texture data for texels bounding pixel 416's address, and then filtering that texture data. Then acts 312-316 might comprise that sampler adding offset Δv to the texture address of pixel 416 to determine the texture address (u1+Δu, v1+2Δv) of adjacent pixel 419, obtaining or fetching the texture data for texels bounding pixel 419's address, and then filtering that texture data.

Alternatively, for another example, acts 306-310 may comprise a texture sampler adding offsets Δu and Δv to the texture coordinates (u1+Δu, v1+Δv) of pixel 416 to determine the texture address (u1+2Δu, v1+2Δv) of adjacent pixel 420, obtaining or fetching the texture data for texels bounding pixel 420's address, and then filtering that texture data. Then acts 312-316 might comprise that sampler subtracting offset Δv from the texture address of pixel 420 to determine the texture address (u1+2Δu, v1+Δv) of adjacent pixel 417, obtaining or fetching the texture data for texels bounding pixel 417's address, and then filtering that texture data. Clearly, many other such pixel processing schemes are contemplated by the claimed invention.

Figure 5:
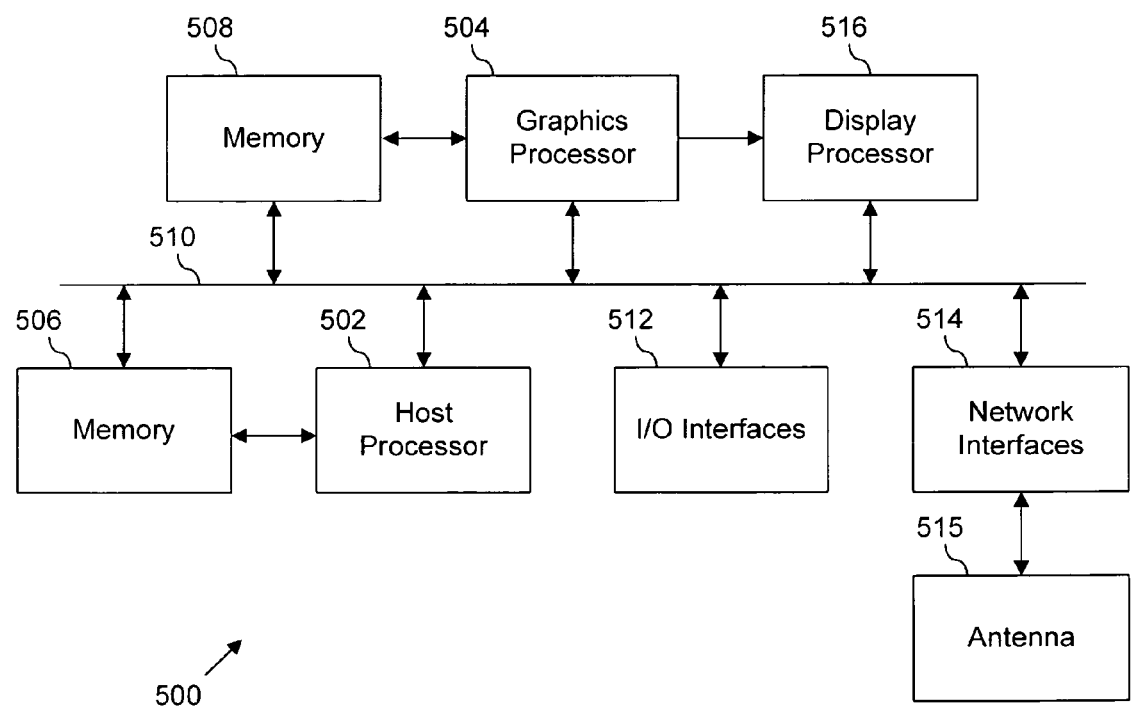
FIG. 5 illustrates a system in accordance with some implementations of the invention.

FIG. 5 illustrates an example system 500 in accordance with some implementations of the invention. System 500 may include a host processor 502, a graphics processor 504, memories 506 and 508 (e.g., dynamic random access memory (DRAM), static random access memory (SRAM), non-volatile memory, etc.), a bus or communications pathway(s) 510, input/output (I/O) interfaces 512 (e.g., universal synchronous bus (USB) interfaces, parallel ports, serial ports, telephone ports, and/or other I/O interfaces), network interfaces 514 (e.g., wired and/or wireless local area network (LAN) and/or wide area network (WAN) and/or personal area network (PAN), and/or other wired and/or wireless network interfaces), and a display processor and/or controller 516. System 500 may also include an antenna 515 (e.g., dipole antenna, narrowband Meander Line Antenna (MLA), wideband MLA, inverted "F" antenna, planar inverted "F" antenna, Goubau antenna, Patch antenna, etc.) coupled to network interfaces 514. System 500 may be any system suitable for processing 3D graphics data and providing that data in a rasterized format suitable for presentation on a display device (not shown)

such as a liquid crystal display (LCD), or a cathode ray tube (CRT) display to name a few examples.

System 500 may assume a variety of physical implementations. For example, system 500 may be implemented in a personal computer (PC), a networked PC, a server computing system, a handheld computing platform (e.g., a personal digital assistant (PDA)), a gaming system (portable or otherwise), a 3D capable cellular telephone handset, etc. Moreover, while all components of system 500 may be implemented within a single device, such as a system-on-a-chip (SOC) integrated circuit (IC), components of system 500 may also be distributed across multiple ICs or devices. For example, host processor 502 along with components 506, 512, and 514 may be implemented as multiple ICs contained within a single PC while graphics processor 504 and components 508 and 516 may be implemented in a separate device such as a television or other display coupled to host processor 502 and components 506, 512, and 514 through communications pathway 510.

Host processor 502 may comprise a special purpose or a general purpose processor including any control and/or processing logic, hardware, software and/or firmware, capable of providing graphics processor 504 with 3D graphics data and/or instructions. Processor 502 may perform a variety of 3D graphics calculations such as 3D coordinate transformations, etc. the results of which may be provided to graphics processor 504 over bus 510 and/or that may be stored in memories 506 and/or 508 for eventual use by processor 504.

In one implementation, host processor 502 may be capable of performing any of a number of tasks that support the simplification of 3D texture address computations based on aligned, non-perspective objects. These tasks may include, for example, although the invention is not limited in this regard, providing 3D graphics data to graphics processor 504, placing one or more texture maps in memory 508, downloading microcode (via antenna 515 and interfaces 514) to processor 504, initializing and/or configuring registers within processor 504, interrupt servicing, and providing a bus interface for uploading and/or downloading 3D graphics data. In alternate implementations, some or all of these functions may be performed by graphics processor 504. While FIG. 5 shows host processor 502 and graphics processor 504 as distinct components, the invention is not limited in this regard and those of skill in the art will recognize that processors 502 and 504 possibly in addition to other components of system 500 may be implemented within a single IC.

Graphics processor 504 may comprise any processing logic, hardware, software, and/or firmware, capable of processing graphics data. In one implementation, graphics processor 504 may implement a 3D graphics architecture capable of processing graphics data in accordance with one or more standardized rendering application programming interfaces (APIs) such as OpenGL 2.0™ ("The OpenGL Graphics System: A Specification" (Version 2.0; Oct. 22, 2004)) and DirectX 9.0™ (Version 9.0c; Aug. 8, 2004) to name a few examples, although the invention is not limited in this regard. Graphics processor 504 may process 3D graphics data provided by host processor 502, held or stored in memories 506 and/or 508, and/or provided by sources external to system 500 and obtained over bus 510 from interfaces 512 and/or 514.

Graphics processor 504 may receive 3D graphics data in the form of 3D scene data and process that data to provide image data in a format suitable for conversion by display processor 516 into display-specific data. In addition, graphics processor 504 may implement a variety of 3D graphics processing components and/or stages (not shown) such as an applications stage, a geometry stage and/or a rasterizer stage in addition to one or more texture samplers. Texture samplers implemented by graphics processor 504 may fetch or access texture data stored or held in either or both of memories 506 and 508. Further, in accordance with some implementations of the invention, graphics processor 504 may implement one or more texture samplers capable of using a starting or initial texture address for a pixel and associated texture address offsets to determine or generate texture addresses for pixels adjacent to that pixel so that processor 504 may enable simplification of 3D texture address computations based on aligned, non-perspective objects.

Bus or communications pathway(s) 510 may comprise any mechanism for conveying information (e.g., graphics data, instructions, etc.) between or amongst any of the elements of system 500. For example, although the invention is not limited in this regard, communications pathway(s) 510 may comprise a multipurpose bus capable of conveying, for example, instructions (e.g., macrocode) between processor 502 and processor 504. Alternatively, pathway(s) 510 may comprise a wireless communications pathway.

Display processor 516 may comprise any processing logic, hardware, software, and/or firmware, capable of converting rasterized image data supplied by graphics processor 504 into a format suitable for driving a display (i.e., display-specific data). For example, while the invention is not limited in this regard, processor 504 may provide image data to processor 516 in a specific color data format, for example in a compressed red-green-blue (RGB) format, and processor 516 may process such RGB data by generating, for example, corresponding LCD drive data levels etc. Although FIG. 5 shows processors 504 and 516 as distinct components, the invention is not limited in this regard, and those of skill in the art will recognize that, for example, some if not all of the functions of display processor 516 may be performed by graphics processor 504 and/or host processor 502.

Thus, by taking advantage of the circumstances when a texture is aligned to the pixels being rendered (i.e., where no rotation or perspective occurs relative to the pixel's coordinate system) the address computation for a given pixel may, in accordance with some implementations of the invention, be simplified to the addition of offsets to the address of an adjacent pixel. In this manner, a texture address compute engine may use fewer computations to generate texture addresses or fewer parallel computation units may be employed thereby reducing die size.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. For example, while FIG. 1 and the accompanying text may show and describe a single texture sampler 102 coupled to a single pixel shader 110, those skilled in the art will recognize that data processors in accordance with the invention may include rendering engines that employ multiple texture samplers, each operating in accordance with the invention, coupled to one or more pixel shaders. Clearly, many other implementations may be employed to provide for the simplification of 3D texture address computations based on aligned, non-perspective objects consistent with the claimed invention.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A non-transitory computer readable medium having stored thereon instructions that, when executed by a machine, cause the machine to:

receive a texture address of a first pixel;

determine when a texture is aligned to pixels being rendered: and if the texture is aligned, determine a texture address of a second pixel, such that the texture address of the second pixel is the texture address of the first pixel plus a constant and determine a texture address of a third pixel, such that the texture address of the third pixel is the texture address of the second pixel plus said constant.

2. The computer readable medium of claim 1, wherein the constant value comprises a fixed number of units in texture coordinate space.

3. An apparatus comprising:

a hardware texture sampler to receive a texture address of a first pixel; and hardware texture address generation logic to determine whether a texture is aligned to pixels being rendered, if so, determine a texture address of a second pixel by adding a constant to the texture address of the first pixel and determine a texture address of a third pixel by applying the constant to the texture address of the second pixel.

4. The apparatus of claim 3, wherein the first pixel is adjacent to the second pixel.

5. A system comprising:

address generation logic to determine a texture address of a first pixel by adding a constant to a texture address of a second pixel and to determine a texture address of a third pixel by adding the constant to a texture address of the second pixel;

memory to store texture data; and a texture sampler to fetch the texture data from memory in response to the texture address of the first pixel.

6. The system of claim 5, wherein the memory comprises one of dynamic random access memory (DRAM), static random access memory (SRAM), or non-volatile memory.

7. The system of claim 5, further comprising an antenna to receive the texture data.

8. The system of claim 7, wherein the antenna comprises one of a dipole antenna, a narrowband Meander Line Antenna (MLA), a wideband MLA, an inverted "F" antenna, a planar inverted "F" antenna, a Goubau antenna, or a Patch antenna.

* * * * *